(12) United States Patent
Hahn

(10) Patent No.: US 7,686,604 B2
(45) Date of Patent: Mar. 30, 2010

(54) COAXIAL INJECTOR SCREW PROVIDING IMPROVED SMALL SHOT METERING

(75) Inventor: John J. Hahn, Hartford, WI (US)

(73) Assignee: MGS Mfg. Group, Inc., Germantown, WI (US)

( * ) Notice: Subject to any disclaimer, the term of this patent is extended or adjusted under 35 U.S.C. 154(b) by 1072 days.

(21) Appl. No.: 11/017,342

(22) Filed: Dec. 20, 2004

(65) Prior Publication Data

US 2006/0134264 A1   Jun. 22, 2006

(51) Int. Cl.
 B29C 45/54   (2006.01)
(52) U.S. Cl. .................. 425/145; 425/582; 425/583; 425/585; 425/587; 425/DIG. 227; 366/79; 366/100; 366/162.4; 366/289; 366/293
(58) Field of Classification Search .......... 425/207, 425/208, 209, 582, 583, 587, 145, 561, 580, 425/147, 585, DIG. 227; 366/79, 144, 293, 366/204, 100, 162.4, 162.5, 286, 289
See application file for complete search history.

(56) References Cited

U.S. PATENT DOCUMENTS

| | | | | |
|---|---|---|---|---|
| 1,647,683 A * | 11/1927 | Bollinger | ................ | 425/133.1 |
| 2,769,201 A * | 11/1956 | Lorenian | ................ | 425/133.1 |
| 2,923,976 A * | 2/1960 | Strauss | ................ | 425/547 |
| 3,021,561 A * | 2/1962 | Reifenhauser | ................ | 425/208 |
| 3,175,248 A * | 3/1965 | Swenson | ................ | 366/78 |
| 3,401,426 A * | 9/1968 | Evans | ................ | 425/565 |
| 3,502,752 A * | 3/1970 | Brown | ................ | 264/412 |
| 3,689,182 A * | 9/1972 | Kovacs | ................ | 425/208 |
| 3,693,946 A * | 9/1972 | Merritt | ................ | 366/79 |
| 3,695,575 A * | 10/1972 | Hauser | ................ | 366/76.1 |
| 3,746,315 A * | 7/1973 | Rizzi et al. | ................ | 366/294 |
| 3,797,808 A * | 3/1974 | Ma et al. | ................ | 366/78 |
| 3,810,728 A * | 5/1974 | Jacobs | ................ | 425/547 |
| 3,822,057 A * | 7/1974 | Wheeler | ................ | 366/76.2 |
| 3,822,867 A * | 7/1974 | Evans | ................ | 366/79 |
| 3,865,354 A * | 2/1975 | Burpulis et al. | ................ | 366/76.2 |
| 3,921,963 A * | 11/1975 | Neff et al. | ................ | 366/78 |
| 3,924,840 A * | 12/1975 | Nelson, Jr. | ................ | 366/79 |
| 3,966,372 A * | 6/1976 | Yasuike et al. | ................ | 425/4 R |
| 3,985,349 A * | 10/1976 | Ritzie | ................ | 366/78 |
| 4,256,678 A * | 3/1981 | Fujita et al. | ................ | 264/40.1 |
| 4,290,702 A * | 9/1981 | Klein et al. | ................ | 366/77 |
| 4,365,946 A * | 12/1982 | Anders | ................ | 425/144 |
| 4,395,376 A * | 7/1983 | Matthews | ................ | 264/73 |
| 4,714,422 A * | 12/1987 | Meeker et al. | ................ | 425/204 |
| 4,746,220 A * | 5/1988 | Sukai et al. | ................ | 366/79 |
| 4,755,123 A * | 7/1988 | Otake | ................ | 425/145 |

(Continued)

Primary Examiner—Eric Hug
Assistant Examiner—Seyed Masoud Malekzadeh
(74) Attorney, Agent, or Firm—Boyle Fredrickson, SC

(57) ABSTRACT

A screw for injection molding provides a coaxial piston that allows the effective cross-sectional area of the screw to be varied during the injection cycle permitting small shot metering with relatively large diameter injection molding screws. The screw is positioned within the injector barrel of a injection molding assembly and includes a number of threads disposed around its outer surface configured to advance molten plastic to the front of the barrel. The screw further includes a central bore having a piston slidably received within the central bore. The plastic shot to be forced out through the nozzle of the injection molding assembly is controlled by movement of the piston within the screw.

7 Claims, 1 Drawing Sheet

U.S. PATENT DOCUMENTS

| | | | | |
|---|---|---|---|---|
| 4,802,140 A * | 1/1989 | Dowling | ................. | 366/79 |
| 4,889,478 A * | 12/1989 | Sato | ................. | 425/149 |
| 4,908,169 A * | 3/1990 | Galic et al. | ................. | 264/410 |
| 5,028,373 A * | 7/1991 | Taniguchi et al. | ................. | 264/328.1 |
| 5,123,833 A * | 6/1992 | Parker | ................. | 425/557 |
| 5,439,633 A * | 8/1995 | Durina et al. | ................. | 264/328.17 |
| 5,614,227 A * | 3/1997 | Yarbrough | ................. | 425/133.1 |
| 5,770,245 A * | 6/1998 | Takizawa et al. | ................. | 425/549 |
| 5,935,494 A * | 8/1999 | Wurl et al. | ................. | 264/40.1 |
| 5,951,928 A * | 9/1999 | Jinping | ................. | 264/69 |
| 6,183,682 B1 * | 2/2001 | Shimizu et al. | ................. | 264/328.1 |
| 6,190,601 B1 * | 2/2001 | Nakamura | ................. | 264/443 |
| 6,210,030 B1 * | 4/2001 | Ibar | ................. | 366/78 |
| 6,234,659 B1 * | 5/2001 | Takashima et al. | ................. | 366/79 |
| 6,340,439 B1 * | 1/2002 | Hiraoka | ................. | 264/40.1 |
| 6,562,100 B2 * | 5/2003 | Takizawa et al. | ................. | 75/386 |
| 6,627,134 B2 * | 9/2003 | Thomson | ................. | 264/255 |
| 6,790,020 B2 * | 9/2004 | Kitayama et al. | ................. | 425/4 R |
| 6,808,380 B1 * | 10/2004 | Watanabe et al. | ................. | 425/131.1 |
| 6,921,190 B2 * | 7/2005 | Albrecht et al. | ................. | 366/78 |
| 6,942,376 B2 * | 9/2005 | Hartman | ................. | 366/79 |
| 6,949,208 B1 * | 9/2005 | Kawauchi et al. | ................. | 264/50 |
| 7,160,102 B2 * | 1/2007 | Zimmet | ................. | 425/561 |
| 7,264,757 B2 * | 9/2007 | Chang et al. | ................. | 264/50 |
| 7,291,297 B2 * | 11/2007 | Weatherall et al. | ................. | 264/40.1 |
| 7,291,298 B2 * | 11/2007 | Serniuck et al. | ................. | 264/40.1 |
| 7,293,982 B2 * | 11/2007 | Schlummer | ................. | 425/587 |
| 7,318,713 B2 * | 1/2008 | Xu et al. | ................. | 425/4 R |
| 2001/0004930 A1 * | 6/2001 | Takizawa et al. | ................. | 164/312 |
| 2003/0075833 A1 * | 4/2003 | Thomson | ................. | 264/328.17 |
| 2004/0089971 A1 * | 5/2004 | Hartman | ................. | 264/211 |
| 2004/0213076 A1 * | 10/2004 | Albrecht et al. | ................. | 366/78 |
| 2005/0161847 A1 * | 7/2005 | Weatherall et al. | ................. | 264/40.1 |
| 2006/0034958 A1 * | 2/2006 | Schlummer | ................. | 425/4 C |

* cited by examiner

COAXIAL INJECTOR SCREW PROVIDING IMPROVED SMALL SHOT METERING

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates generally to injection molding, and more particularly, to an injection screw and barrel providing improved control of small shots of plastic during injection molding.

The injection molding process employs an injector that forces a volume of thermoplastic material (a "shot") under pressure into a mold cavity. A common injector design provides an outer barrel holding an injection screw. Pellets of thermoplastic resin from a hopper enter the barrel at a feed zone and are received by threads ("flights") on the injection screw. The injection screw rotates within the barrel to shear, blend, and advances the molten plastic toward the front of the barrel near a nozzle that communicates with the mold cavity.

As molten plastic is advanced toward the front of the barrel, the injection screw retracts, allowing molten plastic to fill a metering zone just behind the nozzle. At the time of the injection, the injection screw is moved like a piston to push the plastic from the metering zone into the nozzle and ultimately into the mold.

In order to obtain consistent and high quality molded parts, the movement of the screw within the barrel must be accurately controlled. This is difficult for small shot sizes where very little screw movement occurs. For this reason for small shots of plastic, it is desirable to reduce the diameter of the bore of the injector barrel and the diameter of the injection screw so as to provide the largest possible amount of screw travel for the small shot volume.

Small injection screws are difficult to manufacture, and there are practical limits on injection screw diameter resulting from the need for thread depth and sufficient root diameter to withstand the torque and compression placed on the injection screw.

BRIEF SUMMARY OF THE INVENTION

The present invention provides an injector screw having a coaxial piston that may be moved independently of the screw. The piston allows an effective variation in the cross section area of the screw allowing the injection shot to be controlled by (1) movement of the piston, (2) reduced movement of the screw alone, or (3) a combination of screw and piston motion. As a result, larger screw diameters may be fabricated and used with actuators having long strokes and high accuracy while still metering small amounts of plastic.

Specifically, the present invention provides a screw for fitting within an injector barrel where the screw has outer threads to advance molten plastic toward the front of the barrel with rotation of the screw about an axis. The screw includes a central bore along the axis that receives a piston within the central bore to move with respect to the screw.

Thus, it is one object of at least one embodiment of the invention to provide independent control of the effective cross-sectional area of the screw allowing large screw diameters to be used for metering small shots of plastic.

The bore and piston may be cylindrical and the piston may be rotatably received within the central bore of the screw.

Thus it is another object of at least one embodiment of the invention to provide simple construction of the screw and of the piston actuating mechanism.

The piston may have a greater axial length than the screw.

Thus it is another object of at least one embodiment of the invention to allow access to the piston through the rear of the screw typically outside the barrel.

The screw may be used in an injection-molding machine having an injector barrel with a bore extending along an axis and terminating at a nozzle to abut a mold held by the injection-molding machine. A first actuator may be provided for rotating the screw about the axis, and the second actuator may provide relative movement between the piston and the screw.

It is thus another object of at least one embodiment of the invention to provide an injection-molding machine suitable for use with the screw of the present invention.

The molding machine may include a controller communicating with the actuators to rotate the screw to fill a front of the barrel with molten plastic while retracting the piston with respect to the screw away from the nozzle. The piston may be then be advanced by the controller with respect to the screw to eject molten plastic from the nozzle.

Thus it is another object of at least one embodiment of the invention to provide a simple method of providing a range of small shot sizes by changing the diameter of the piston.

Alternatively, the screw may be rotated to fill the front of the barrel with molten plastic and then advanced toward the nozzle while retracting the piston with respect to the screw to eject molten plastic from the nozzle.

Thus it is another object of at least one embodiment of the invention to provide an extremely simple method of adapting current injection molding machines to small shot sizes, for example, by using the normal screw actuation mechanisms with a stationary piston that may subtract from the effective area of the screw.

The piston may retract so that a nozzle end of the piston is within the screw.

Thus it is an object of at least one embodiment of the invention to provide a screw that may be used with existing barrels having relatively small distances between the end of the screw and the barrel nozzle.

Alternatively the piston may be extended from the screw so that when it is retracted, a nozzle end of the piston is not pulled within the screw.

It is thus another object of at least one embodiment of the invention to provide a system in which molten thermoplastic is pulled within the interior of the screw.

These particular objects and advantages may apply to only some embodiments falling within the claims and thus do not define the scope of the invention.

DETAILED DESCRIPTION OF THE PREFERRED EMBODIMENT

Figure 1:
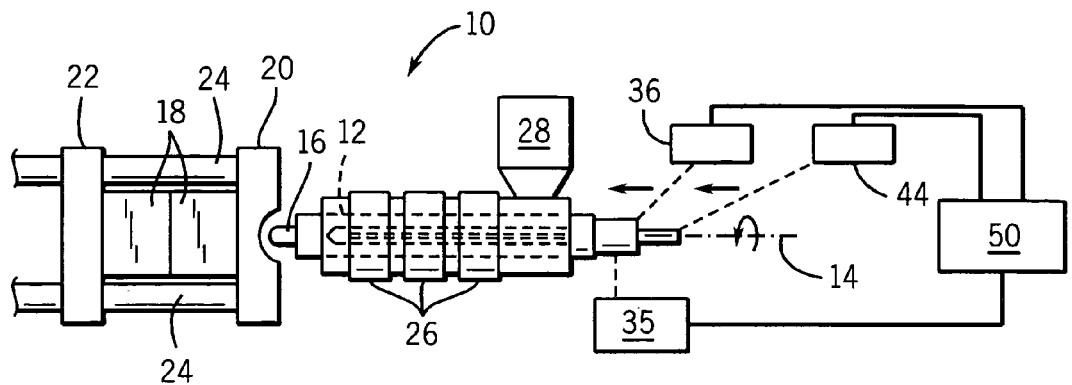
FIG. 1 is a simplified diagram of an injection molding having a barrel holding the small shot injector screw of the present invention.

Referring now to FIG. 1, an injection-molding machine 10 suitable for use with the present invention provides an injector barrel 12 extending along a longitudinal axis 14 having a nozzle 16 defining a front of the injector barrel 12. As is generally understood in the art, one or more heater bands 26 may be placed about the barrel 12 and a rear of the barrel may support a vertically extending hopper 28 providing a source of thermoplastic pellets.

The nozzle 16 of the injector barrels 12 may abut a mold portion 18 to inject a shot of plastic into a mold formed by the mold portions 18. During the injection process, the mold portions 18 are held clamped together between a stationary platen 20 and a movable platen 22, the latter sliding axially along tie bars 24.

Figure 2:
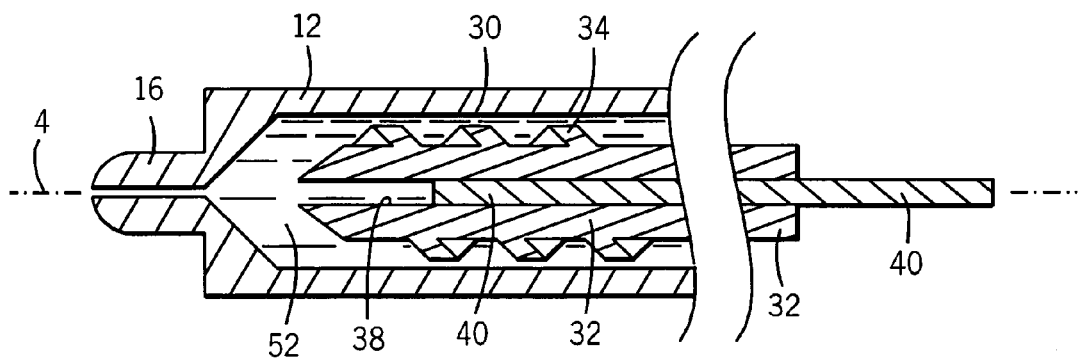
FIG. 2 is a fragmentary cross-sectional view of the barrel and screw of FIG. 1 showing a mode of retraction of a coaxial piston to collect a shot volume.

Referring also to FIG. 2, the barrel 12 may include a central cylindrical bore 30 that may receive an injector screw 32. The injector screw 32 extends generally along axis 14 and has screw threads 34 extending helically around the outside of the screw 32.

A rear end of the screw 32 (removed from the nozzle 16) may project beyond the barrel 12 to be mechanically attached to a screw rotation actuator 35 and a screw translation actuator 36 of types well known in the art. The screw rotation actuator 35, for example, a hydraulic motor, allows controllable rotation of the screw 32 about axis 14 and screw translation actuator 36, for example, a hydraulic cylinder, allows controllable translation of the screw 32 along axis 14. Together, these motions allow melting of the pellets by the rotating screw 32 while allowing the screw 32 to be retracted as molten thermoplastic is accumulated toward the front the of barrel 12. The controlled forward translation of the screw 32 then allows the molten thermoplastic to be ejected from the barrel 12 during the injection cycle.

Referring still to FIGS. 1 and 2 in the present invention, the screw 32 includes a coaxial bore 38 extending along axis 14 and passing the entire length through the body of the screw 32. A cylindrical piston rod 40 may slide smoothly within the bore 38 with the outer circumference sealing against the inner surface of the bore 38 or seals (not shown) placed therein. The cylindrical piston rod 40 has a length along axis 14 greater than the length of the screw 32 so that the cylindrical piston rod 40 extends from the rear end of the screw 32 to be connected mechanically to a piston translation actuator 44 allowing motion of the piston rod 40 within the screw 32 independent of movement of translation movement of the screw 32.

Each of the actuators 35, 36 and 44 may provide connections to a controller 50 which may coordinate (1) the sequence of movements of the screw 32 in rotation and translation, and (2) the movement of the piston rod 40 in translation, both as a function of various stages of the injection molding process.

Referring again to FIG. 2 in a first stage of operation, screw 32 may be rotated per conventional injection molding techniques to collect plastic pellets from the hopper 28 and to elasticize them by grinding and moving them through the heated barrel 12. Through this rotation, molten plastic 52 is moved to the nozzle end of the barrel 12. As the plastic 52 accumulates at the nozzle end of the barrel 12, the piston rod 40 may be retracted allowing plastic 52 to pass around the edges of the screw 32 and into a cavity formed by the retracting piston rod 40.

When piston rod 40 is retracted sufficiently to accumulate the necessary volume for the desired injection shot, rotation of the screw 32 may stop and screw 32 may be held in place while piston rod 40 is advanced forward to eject the plastic 52 from the cavity formed by the bore 38 of the injector screw 32. This plastic 52 moves forward and out of nozzle 16.

In one variation of this embodiment, screw actuator 36 may be omitted as the screw 32 need only rotate and need not translate to cause the ejection of plastic 52. In a second variation, the injection state is accompanied by motion of both of the screw 32 and piston rod 40.

Figure 3:
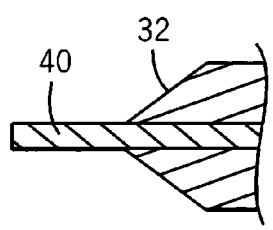
FIG. 3 is a figure similar to that of FIG. 2 showing an alternative extension mode of the coaxial piston as may define a shot volume.

Referring now to FIG. 3 in an alternative embodiment, piston rod 40 may be initially extended out of the front of the screw 32 by an amount sufficient so that its volume in extension is equal to (or no less than) the desired shot of plastic 52. During the plasticization step, molten plastic 52 pushes the extended portion of piston rod 40 into the screw 32 not necessarily causing the piston rod 40 to retract into the screw 32 so that molten plastic need be drawn into the screw 32. The piston rod 40 is then re-extended to eject the necessary shot of plastic from the barrel 12.

Referring again to FIG. 2, in yet another mode of operation of the invention, once sufficient plastic 52 has accumulated toward the front of the barrel 12, the screw 32 may be advanced with the piston rod 40 held stationary (or retracted) with respect to the barrel 12. This combined motion of the piston rod 40 with respect to the screw 32 decreases the effective cross-sectional area of the screw 32 causing a smaller amount of plastic 52 to be injected through nozzle 16 than would be obtained with a solid screw 32. Note that at least one version of this mode of operations does not require absolute movement of the piston rod 40, and thus does not require piston translation actuator 44.

It will be understood that the present invention also contemplates possible simultaneous relative movement of piston rod 40 forward and screw 32 backward to provide a range of possible metering solutions.

It is specifically intended that the present invention not be limited to the embodiments and illustrations contained herein, but include modified forms of those embodiments including portions of the embodiments and combinations of elements of different embodiments as come within the scope of the following claims.

I claim:

1. An injection molding machine comprising:
an injector barrel having a bore extending along an axis and terminating in a nozzle to abut a mold held by the injection molding machine;
a screw positioned within the injector barrel, the screw having outer threads to advance a molten plastic through the bore toward the nozzle with rotation of the screw about an axis, the screw further having a central bore along the axis;
a first actuator for rotating the screw about the axis;
a piston slidably received within the central bore of the screw movable along the axis with respect to the screw;
a second actuator providing relative movement between the piston and the screw,
wherein the second actuator is a screw translation actuator moving the screw in translation along the axis; and
a controller communicating with the first actuator and the second actuator to execute a stored program of the controller that (i) rotates the screw relative to the injector barrel to fill a front of the barrel with molten plastic and (ii) translates the screw along the axis of the bore and relative to the injector barrel toward the nozzle of the injector barrel while concurrently retracting the piston relative to the injector barrel and with respect to the screw to eject molten plastic from the nozzle.

2. The injection molding machine of claim 1 further comprising a third actuator, wherein the third actuator is a piston actuator moving the piston in translation along the axis.

3. The injection-molding machine of claim 1 wherein the stored program advances the piston with respect to the screw to eject molten plastic from the nozzle after the screw has been advanced.

4. The injection molding machine of claim 3 wherein the piston is retracted so that a nozzle end of the piston is within the screw.

5. The injection molding machine of claim 3 wherein the piston is retracted so that an end of the piston nearer the nozzle of the injector barrel is not pulled within the screw.

6. The injection molding machine of claim 3 wherein the piston is advanced with respect to the screw so that an end of the piston nearer the nozzle extends from the screw.

7. The injection molding machine of claim 3 wherein the piston is advanced with respect to the screw so that an end of the piston nearer the nozzle remains within the screw.

* * * * *